United States Patent Office 3,367,932
Patented Feb. 6, 1968

3,367,932
3-SUBSTITUTED-1-(5-NITROFURFURYLIDENE-AMINO)-2-IMIDAZOLIDINONES
Harry Raymond Snyder, Jr., Norwich, N.Y., assignor to The Norwich Pharmacal Company, a corporation of New York
No Drawing. Filed Mar. 10, 1965, Ser. No. 438,770
3 Claims. (Cl. 260—240)

ABSTRACT OF THE DISCLOSURE

New antibacterial 3-substituted-1-(5-nitrofurfurylidene-amino)-2-imidazolidinones.

---

This invention relates to chemical compounds of the formula:

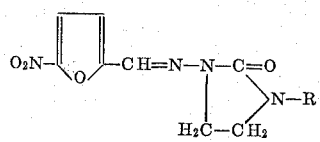

wherein R is a member of the group consisting of 2-methoxyethyl and propargyl and their preparation.

These compounds are useful as antiseptics being capable of inhibiting the growth of bacteria in very small amounts. Bacterial species of the gram-positive and gram-negative type such as *Escherichia coli, Salmonella typhosa, Streptococcus pyogenes, Staphylococcus aureus, Streptococcus agalactiae* and the like, are controlled by media containing from 0.38–25 µg./ml. of these compounds. Not only are these compounds useful in this respect, but they are also capable of combatting lethal infections in animals. Thus, when perorally administered in doses ranging from 20–82 mg./kg./day to mice lethally infected with *Staphylococcus aureus, Salmonella typhosa* or *Escherichia coli*, protection against mortality is achieved.

The compounds of this invention may be readily prepared by bringing together an alkali salt of a 1-arylidene-amino-2-imidazolidinone such as sodium-1-benzylidene-amino-2-imidazolidinone and the appropriate halide such as 2-methoxyethyl chloride or propargyl bromide in the presence of an inert reaction solvent such as dimethylformamide and preferably under the influence of heat to form the 3 - substituted-1-arylideneamino-2-imidazolidinone, which, upon interaction with 5-nitrofurfural in an acid medium, preferably under the influence of heat, yields the desired 3-(2-methoxyethyl) or alkinyl 1-(5-nitrofurfuryl-ideneamino)-2-imidazolidinone.

The compounds of this invention may be incorporated in suitable dosage forms such as capsules, tablets, lozenges, suspensions, elixirs and the like using excipients and adjuvants familiar to the art.

In order that this invention may be readily available to those skilled in the art, the following illustrative examples are supplied:

EXAMPLE I

*3-(2-methoxyethyl)-1-(5-nitrofurfurylideneamino)-2-imidazolidinone*

A. 1-BENZYLIDENEAMINO-3-(2-METHOXYETHYL)-2-IMIDAZOLIDINONE 1-benzylideneamino-2-imidazolidinone (95 g., 0.5 mole) is placed in a 5-l, 3-necked flask fitted with a sealed stirrer, thermometer, addition funnel (pressure equalizer type), a gas inlet sidearm, and a reflux condenser topped by a tube leading to a bubbler. The compound is dissolved in dimethylformamide (ca. 2500 ml.). After sweeping the system with dry nitrogen, sodium hydride, 56.6% dispersion in oil (21.5 g., 0.5 mole) is added. The mixture is stirred at near reflux temperature for four hours. The reaction mixture is cooled to 80° C. 2-methoxyethyl chloride (47.5 g., 0.5 mole) dissolved in dimethylformamide is added through the addition funnel to the reaction mixture. The reaction mixture is heated and stirred at ca. 80° C. overnight. The solution is concentrated under reduced pressure. The residue is diluted with water until a precipitate appears, filtered, washed with water, and dried at 65° C. to yield 113 g. (90%) of A., M.P. ca. 115° C.

B. 3-(2-METHOXYETHYL)-1-(5-NITROFURFURYLIDENE-AMINO)-2-IMIDAZOLIDINONE

1 - benzylideneamino-3-(2-methoxyethyl)-2-imidazolidinone (113 g., 0.457 mole) is placed in a flask together with water (700 ml.) and methanol (500 ml.). The solution is acidified with concentrated hydrochloric acid and heated on the steam bath for ten minutes. 5-nitrofurfural (63 g., 0.45 mole) dissolved in some methanol is added. The reaction mixture is heated on the steam bath for two hours, cooled in an ice bath, and filtered. The product is washed with water and dried at 65° C. to yield 76 g. (60%) of the title product. This may be recrystallized from nitromethane-ethanol to yield 35 g., M.P. 156–158° C. (corr.).

*Analysis.*—Calcd. for $C_{11}H_{14}N_4O_5$: C, 46.81; H, 5.00; N, 19.85. Found: C, 46.74, 46.82; H, 4.94, 5.00; N, 20.05, 19.93.

EXAMPLE II

*3-propargyl-1-(5-nitrofurfurylideneamino)-2-imidazolidinone*

A. 1-BENZYLIDENEAMINO-3-PROPARGYL-2-IMIDAZOLIDINONE

1 - benzylideneamino-2-imidazolidinone (95.0 g., 0.5 mole) is placed in a 5-l., 3-necked flask equipped with a sealed stirrer, thermometer, addition funnel (pressure equalizer type), gas inlet sidearm and a reflux condenser topped by a tube leading to a bubbler. The compound is dissolved in dimethylformamide (ca. 2500 ml.). After sweeping the system with dry nitrogen, sodium hydride, 56.6% dispersion in oil, (24.0 g., 0.566 mole) is added. The mixture is stirred at ca. 130° C. for four hours. After cooling to about 50° C, propargyl bromide (60.0 g., 0.5 mole) dissolved in dimethylformamide is added through the addition funnel. The mixture is stirred and refluxed overnight. The dimethylformamide is removed under reduced pressure, and the residue is washed with water, collected and dried to yield 81.1 g. (71.0%), M.P. 158–164° C.

B. 3-PROPARGYL-1-(5-NITROFURFURYLIDENEAMINO)-2-IMIDAZOLIDINONE 1-benzylideneamino - 3 - propargyl-2-imidazolidinone (81.1 g., 0.358 mole) is dissolved in aqueous methanol. 5-nitrofurfural (51.0 g., 0.358 mole) dissolved in methanol is added together with a few ml. of conc. hydrochloric acid. The solution is heated on the steam bath for two hours, cooled in an ice bath and filtered. The yield of title compound is 74 g. (78%), M.P. 192–195° C.

*Analysis.*—Calcd.: C, 50.38; H, 3.84; N, 21.37. Found: C, 50.39; H, 4.06; N, 21.09.

What is claimed is:
1. A compound of the formula:

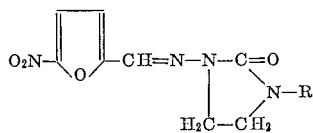

wherein R is a member of the group consisting of 2-methoxyethyl and propargyl.

2. 3 - (2-methoxyethyl)-1-(5-nitrofurfurylideneamino)-2-imidazolidinone.

3. 3 - propargyl-1-(5-nitrofurfurylideneamino)-2-imidazolidinone.

References Cited
UNITED STATES PATENTS

| 3,075,973 | 1/1963 | Michels | 260—240 |
| 3,154,543 | 10/1964 | Ebetino et al. | 260—240 |
| 3,157,645 | 11/1964 | Spencer | 260—240 |
| 3,254,075 | 5/1966 | Ebetino | 260—240 |

OTHER REFERENCES

Chemical Abstracts, vol. 54, col. 507, (1960). (Abstract of McKay et al.)

JOHN D. RANDOLPH, *Primary Examiner*.